(12) United States Patent
Sakaguchi

(10) Patent No.: US 11,299,007 B2
(45) Date of Patent: Apr. 12, 2022

(54) SUPPORT DEVICE AND AIR CONDITIONING SYSTEM FOR VEHICLE

(71) Applicant: DENSO CORPORATION, Kariya (JP)

(72) Inventor: Taisuke Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 16/798,772

(22) Filed: Feb. 24, 2020

(65) Prior Publication Data

US 2020/0189349 A1 Jun. 18, 2020

Related U.S. Application Data

(63) Continuation of application No. PCT/JP2018/028964, filed on Aug. 2, 2018.

(30) Foreign Application Priority Data

Aug. 31, 2017 (JP) .............................. JP2017-166811

(51) Int. Cl.
*B60H 1/32* (2006.01)
*B60H 1/00* (2006.01)

(52) U.S. Cl.
CPC ........... *B60H 1/00507* (2013.01); *B60H 1/00* (2013.01); *B60H 1/32* (2013.01)

(58) Field of Classification Search
CPC .. B60H 1/00507; B60H 1/00; B60H 1/00564; B60H 1/32
See application file for complete search history.

(56) References Cited

U.S. PATENT DOCUMENTS

| 8,678,325 B2 * | 3/2014 | Arzate-Engels ........ F16L 3/222 248/68.1 |
| 2011/0284285 A1 * | 11/2011 | Miura ...................... H02G 3/32 174/70 R |
| 2014/0174582 A1 * | 6/2014 | Kehimkar .......... B60H 1/00571 138/106 |
| 2015/0033781 A1 | 2/2015 | Hyakuda et al. |
| 2016/0053924 A1 * | 2/2016 | Hoehn .................... F16L 19/04 285/81 |

FOREIGN PATENT DOCUMENTS

| JP | S61-139377 U | 8/1986 |
| JP | 2007276732 A | 10/2007 |
| JP | 2011057129 A | 3/2011 |
| JP | 2013180646 A | 9/2013 |

* cited by examiner

*Primary Examiner* — David J Teitelbaum
(74) *Attorney, Agent, or Firm* — Harness, Dickey & Pierce, P.L.C.

(57) ABSTRACT

A support device secures first tubes and second tubes to a vehicle body. The first tubes and the second tubes extend outward from an air conditioning case of a vehicle air conditioning system. The support device is outside the air conditioning case. The support device includes a first bracket in contact with the first tubes, and a second bracket in contact with the second tubes. The support device includes a common bracket coupled to both of the first bracket and the second bracket. The common bracket and the first bracket are in contact with the first tubes from opposite sides, holding the first tubes therebetween. The common bracket and the second bracket are in contact with the refrigerant tubes from opposite sides, holding the refrigerant tubes therebetween.

10 Claims, 14 Drawing Sheets

SUPPORT DEVICE AND AIR CONDITIONING SYSTEM FOR VEHICLE

CROSS REFERENCE TO RELATED APPLICATIONS

The present application is a continuation application of International Patent Application No. PCT/JP2018/028964 filed on Aug. 2, 2018, which designated the U.S. and claims the benefit of priority from Japanese Patent Application No. 2017-166811 filed on Aug. 31, 2017. The entire disclosures of all of the above applications are incorporated herein by reference.

TECHNICAL FIELD

The present disclosure relates to a support device supporting a tube and an air conditioning system including a support device.

BACKGROUND

Refrigerant tubes and heater tubes of an air conditioning system for a vehicle are supported by multiple brackets.

SUMMARY

According to at least one embodiment of the present disclosure, a support device secures a set of first tubes and a set of second tubes to an external member. The support device is outside an air conditioning case of a vehicle air conditioning system. The support device includes a first bracket, s second bracket and a common bracket. The first bracket includes a first bracket support supporting the set of first tubes that extends outward from the air conditioning case. The second bracket includes a second bracket support supporting the set of second tubes that extends outward from the air conditioning case. The common bracket is coupled to both the first bracket and the second bracket. The common bracket includes a first tube support and a second tube support. The first tube support supports the set of first tubes and faces the first bracket support across the set of first tubes such that the set of first tubes is held by the first tube support and the first bracket support. The second tube support supports the set of second tubes and faces the second bracket support across the set of second tubes such that the set of second tubes is held by the second tube support and the second bracket support.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
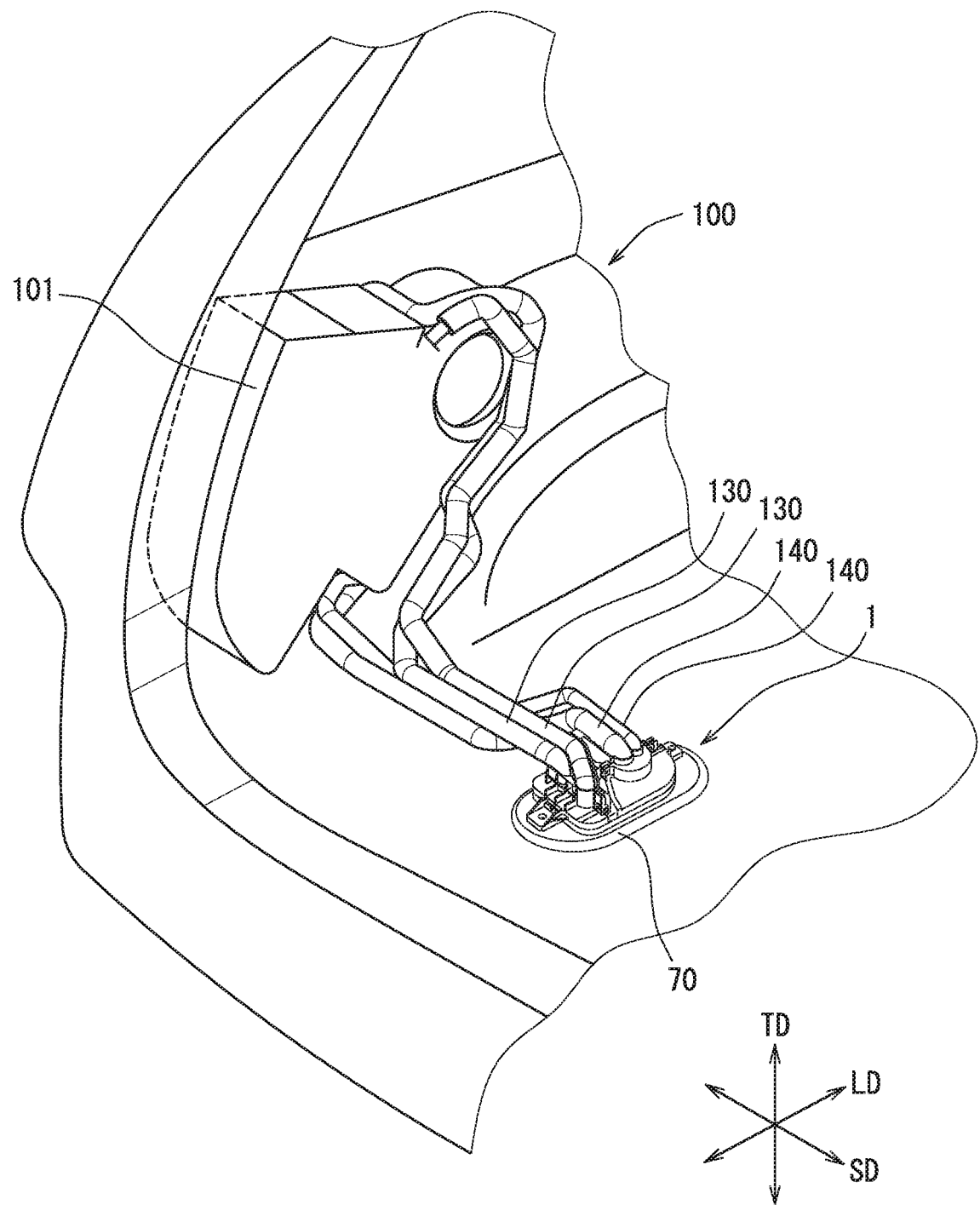
FIG. 1 is a view showing a support device according to at least one embodiment and a vehicle air conditioning system attached to a vehicle body.

A comparative example will be described. In the comparative example, an expansion valve of a refrigerant tube and a heater tube of an air conditioning system for a vehicle are retained by a fixed bracket provided on an air conditioning case, a removable bracket removably attached to the fixed bracket, and a retainer provided on a lid member of the air conditioning case. The heater tube is held between the fixed bracket and the removable bracket. The expansion valve is interposed and supported between the retainer and the two brackets holding the heater tube therebetween.

In the comparative example, the fixed bracket and the retainer are provided on constituent elements of the air conditioning case. Since the fixed bracket and the retainer are integral with the air conditioning case, a sequence of assembly of the brackets to the tubes cannot be readily changed because this sequence affects an assembly sequence of the air conditioning case. Moreover, the expansion valve is supported between the retainer and the two brackets holding the heater tube therebetween. Thus, the brackets cannot be attached to hold the refrigerant tube before holding the heater tube. From this regard also, the sequence of assembly of the brackets to the tubes cannot be readily changed. Therefore, the degree of freedom may be low in assembly sequence in the comparative example.

In contrast, according to a first aspect of the present disclosure, a support device secures a set of first tubes and a set of second tubes to an external member. The support device is outside an air conditioning case of a vehicle air conditioning system. The support device includes a first bracket, s second bracket and a common bracket. The first bracket includes a first bracket support supporting the set of first tubes that extends outward from the air conditioning case. The second bracket includes a second bracket support supporting the set of second tubes that extends outward from the air conditioning case. The common bracket is coupled to both the first bracket and the second bracket. The common bracket includes a first tube support and a second tube support. The first tube support supports the set of first tubes and faces the first bracket support across the set of first tubes such that the set of first tubes is held by the first tube support and the first bracket support. The second tube support supports the set of second tubes and faces the second bracket support across the set of second tubes such that the set of second tubes is held by the second tube support and the second bracket support.

According to the present disclosure, the first bracket, the second bracket, and the common bracket are separate from the air conditioning case. The assembly sequence of the brackets does not affect the assembly sequence of the air conditioning case. Furthermore, in the support device, the first bracket and the common bracket hold therebetween the set of first tubes. The second bracket, which is different from the first bracket, and the common bracket hold therebetween the set of second tubes. Thus, any of the set of first tubes and the set of second tubes can be held first during the assembly of the support device to the tubes. Thus, the sequence of assembly of the support device to the tubes can be readily changed. The common bracket supports both of the set of first tubes and the set of second tubes using the first bracket and the second bracket, respectively. Thus, the tubes can be supported using three brackets, and hence the number of constituent elements for supporting the tubes can be reduced. Therefore, a high degree of freedom in assembly sequence can be provided while reducing in the number of constituent elements.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A support device 1 according to a first embodiment and a vehicle air conditioning system 100 are described below with reference to FIGS. 1 to 11. The vehicle air conditioning system 100 includes an air conditioning case 101 and the support device 1. The air conditioning case 101 internally accommodates an evaporator and a heater core. The air conditioning case 101 is formed by using, for example, a resin material. The air conditioning case 101 internally has an air passageway in which air flows. A fan is attached to the air conditioning case 101 to admit external air into the air passageway. The air conditioning case 101 internally accommodates the evaporator and the heater core. The air conditioning case 101 is placed toward the rear of a vehicle. The air conditioning case 101 is placed, for example, behind a rear wheel well between an interior wall and an outer wall at a lateral location in a luggage space as illustrated in FIG. 1. The air conditioning case 101 is secured to the outer wall using fasteners. FIG. 1 shows a state with the interior wall removed. The air conditioning case 101 is for use in rear air conditioning for providing conditioned air into a space toward the rear of a vehicle compartment.

The vehicle air conditioning system 100 includes a vapor compression refrigeration cycle. The refrigeration cycle is configured using refrigeration cycle functional components and tubes for connecting together the refrigeration cycle functional components. The refrigeration cycle functional components include at least a compressor, a condenser, an expansion valve, and the evaporator. The tubes connect together the refrigeration cycle functional components annularly, enabling refrigerant to circulate in the refrigeration cycle.

The evaporator, one of the refrigeration cycle functional components that configure the refrigeration cycle, is a heat exchanger in which refrigerant circulating in the refrigeration cycle flows. The evaporator is disposed in the air passageway of the air conditioning case 101, performing heat exchange between an air current from the fan and refrigerant. The evaporator is a cooling heat exchanger for cooling an air current by using refrigerant having reduced temperature. The evaporator is coupled to a set of refrigerant tubes 140, which includes a refrigerant tube through which incoming refrigerant passes and a refrigerant tube through which outgoing refrigerant passes.

The set of refrigerant tubes 140 is a set of multiple tubes extending from the evaporator to the outside of the air conditioning case 101. The refrigerant tubes 140 are for connecting the evaporator, which is accommodated inside the air conditioning case 101 located toward the rear of the vehicle, to the condenser, which is placed in an engine compartment located toward the front of the vehicle. The set of refrigerant tubes 140 includes two tubes: the tube through which refrigerant flowing toward the evaporator passes, and the tube through which refrigerant flowing from the evaporator passes. The refrigerant tubes 140 each include a tube main body made using a material such as metal, and an insulator, made using rubber or other elastic material, that covers the outer circumference of the tube main body. The set of refrigerant tubes 140 corresponds to a set of second tubes.

The set of refrigerant tubes 140 extends downward from the air conditioning case 101 and between an interior floor portion of the luggage area and a floor board 70. The set of refrigerant tubes 140 is secured to the floor board 70 by the support device 1. The support device 1 is attached to the floor board 70 to cover a vehicle body through-hole portion formed in the floor board 70. The set of refrigerant tubes 140 is coupled via a coupling member 60, illustrated in FIG. 10, to external tubes located outside of the floor board 70. The external tubes extend toward the front of the vehicle and are coupled to the condenser in the engine compartment via other tubes and couplers.

The heater core is a heat exchanger in which engine coolant flows. The heater core is disposed in the air passageway of the air conditioning case 101 downstream of the evaporator, performing heat exchange between an air current and the engine coolant. The heater core is a heating heat exchanger for heating an air current by using engine coolant having elevated temperature. The heater core is connected to a set of heater tubes 130, which includes a heater tube through which incoming engine coolant passes and a heater tube through which outgoing engine coolant passes.

The set of heater tubes 130 is a set of multiple tubes extending from the heater core to the outside of the air conditioning case 101. The set of heater tubes 130 is for connecting the heater core, which is placed toward the rear of the vehicle, to a radiator, which is placed in the engine compartment located toward the front of the vehicle. The set of heater tubes 130 includes two tubes: the tube through which engine coolant flowing toward the radiator passes, and the tube through which engine coolant flowing from the radiator passes. The heater tubes 130 are each covered with an insulator, as with the refrigerant tubes 140. The set of heater tubes 130 corresponds to a set of first tubes.

The set of heater tubes 130 extends downward from the air conditioning case 101 and between the interior floor portion of the luggage area and the floor board 70, as with the set of refrigerant tubes 140. The set of heater tubes 130, together with the set of refrigerant tubes 140, is supported by the support device 1 at the floor board 70, secured to a bottom portion of a vehicle body. The set of heater tubes 130 extends through the vehicle body through-hole portion via the support device 1 to the outside of the floor board 70 and is coupled to external tubes attached to an outer surface of the floor board 70, i.e., a lower surface of the vehicle body. The external tubes extend toward the front of the vehicle and are coupled to the radiator in the engine compartment via other tubes and couplers.

Figure 2:
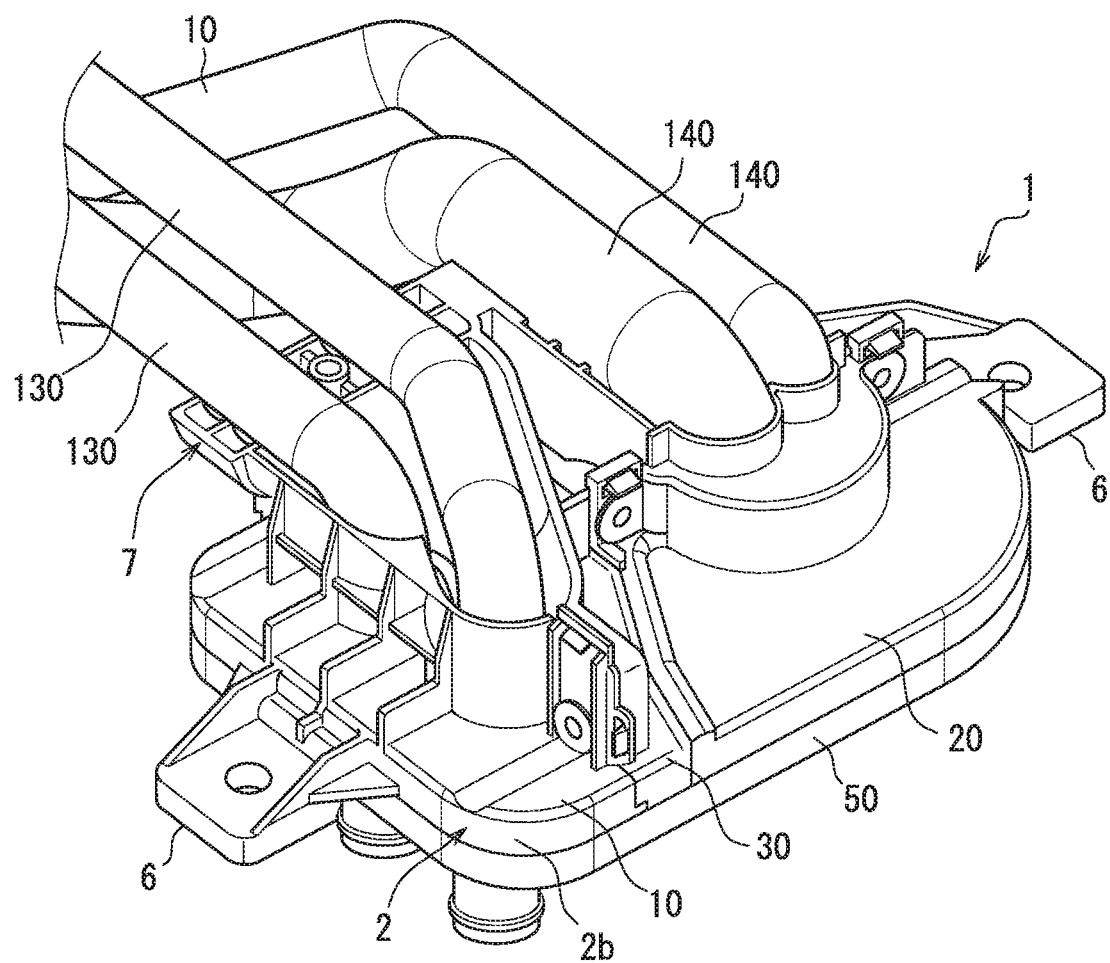
FIG. 2 is a perspective view showing the support device when holding tubes.
Figure 2:
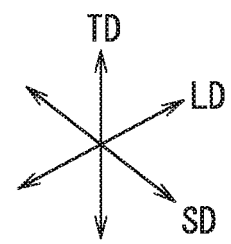
Figure 3:
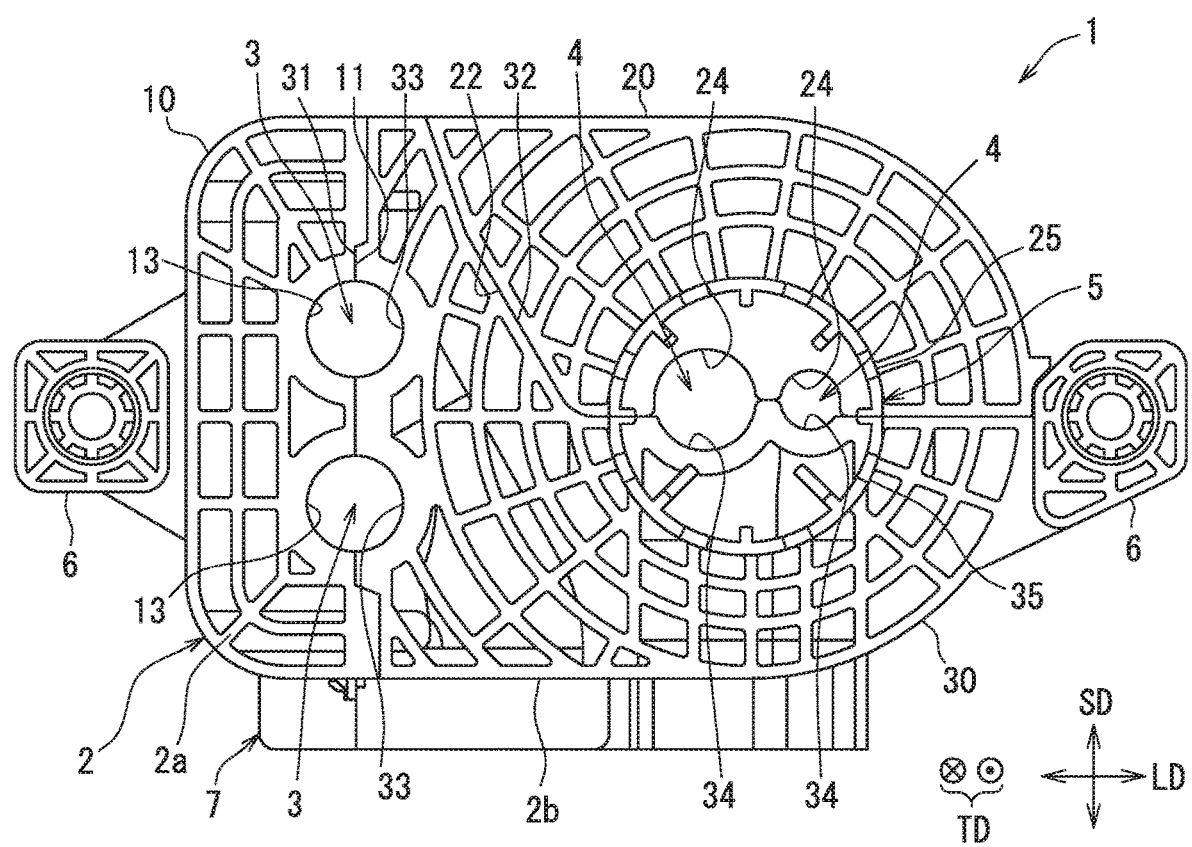
FIG. 3 is a view showing the support device.
Figure 4:
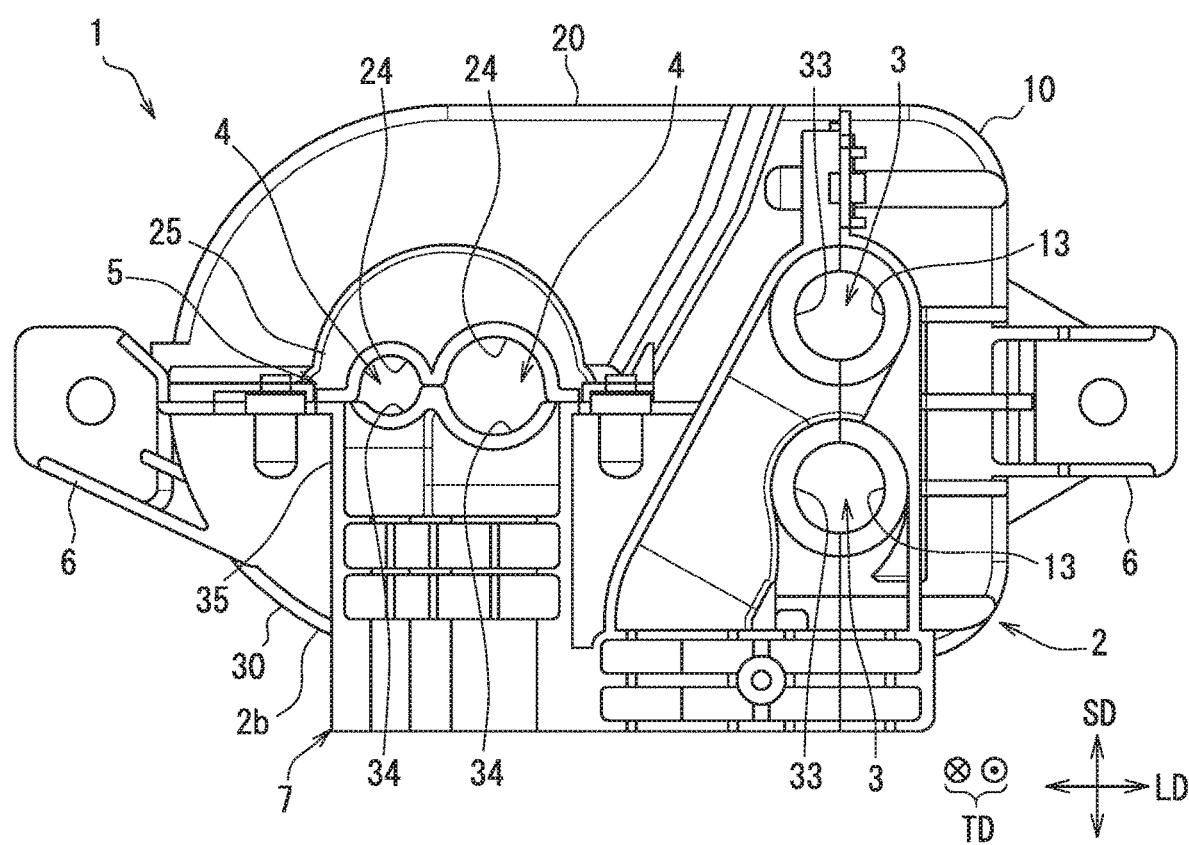
FIG. 4 is a view showing a back surface of the support device of FIG. 3.
Figure 5:
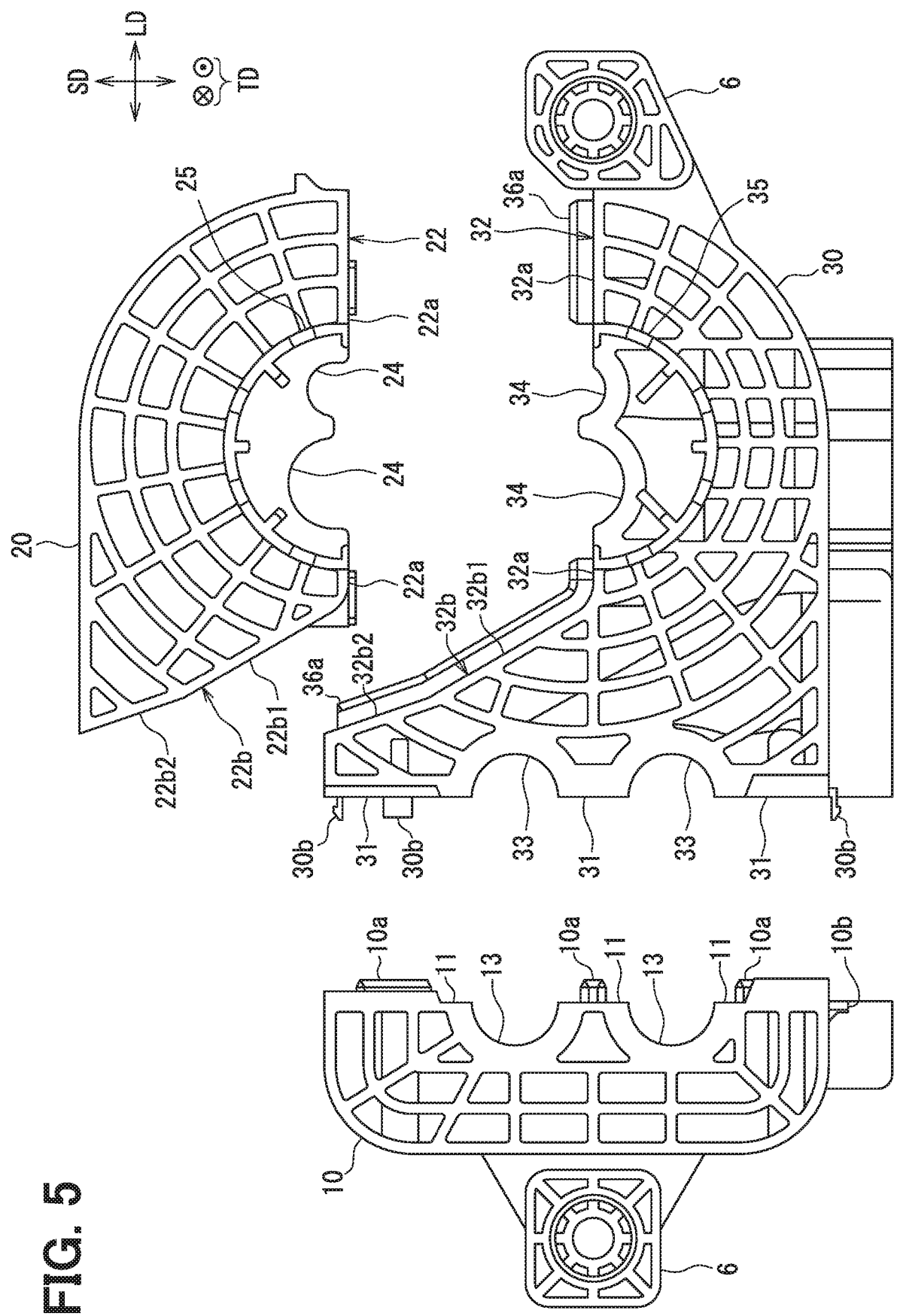
FIG. 5 is a view of the support device divided into three brackets.

As illustrated in FIGS. 2, 3, and 4, the support device 1 is configured by joining together three brackets: namely, a first bracket 10, a second bracket 20, and a common bracket 30. The support device 1 is separate from the air conditioning case 101. The support device 1 includes a base portion 2 and an attachment portion 6 provided on the base portion 2. The base portion 2 includes the three brackets 10, 20, and 30. The support device 1 is attached to an external member that is a portion of the vehicle in a location outside of the air conditioning case 101. The external member is, for example, the vehicle body or the like. In the example illustrated in FIG. 1, the support device 1 is attached to the floor board 70 of the vehicle body. The support device 1 is attached to the vehicle body, in particular, to the floor board 70 of the vehicle body. The support device 1 is attached in a location away from the air conditioning case 101. The base portion 2 has dimensions greater than those of the vehicle body through-hole portion to be large enough to cover the vehicle body through-hole portion. The base portion 2 has, for example, a generally rectangular plate shape with one side having an arc shape. The base portion 2 has a base surface 2a to which a sealing material is affixed. The base surface 2a is a surface of the base portion 2 that is attached over the vehicle body through-hole portion. A surface of the base portion 2 opposite the base surface 2a is hereinafter referred to as a back surface. The base portion 2 has ribs having a grid shape in the base surface 2a. The sealing material is a rubber gasket or other elastic material affixed to the base surface 2a over the substantially entire area of the base surface 2a. The sealing material is for closing the vehicle body through-hole portion when brought into intimate contact with a perimeter portion of the floor board 70 that forms the vehicle body through-hole portion.

The base portion 2 has a set of heater-tube through holes 3 and a set of refrigerant-tube through holes 4. The set of heater tubes 130 pass through the set of heater-tube through holes 3. The set of refrigerant tubes 140 pass through the set of refrigerant-tube through holes 4. The set of heater-tube through holes 3 includes two through holes each having a circular shape. The set of heater tubes 130 pass through the set of heater-tube through holes 3 in a thickness direction TD of the support device 1. The set of heater-tube through holes 3 is formed using a set of through-hole forming portions 13 of the first bracket 10 and a set of first through-hole forming portions 33 of the common bracket 30. Each of the heater-tube through holes 3 has a diameter sized to compress the insulator of the corresponding heater tube 130. The set of heater-tube through holes 3 have, for example, the same diameters. The set of heater-tube through holes 3 are support holes for supporting the set of heater tubes 130 by compressing the respective insulators. The set of heater-tube through holes 3 is disposed, for example, in an alignment direction that is parallel to a widthwise direction SD of the support device 1.

The set of refrigerant-tube through holes 4 includes two through holes each having a circular shape. The set of refrigerant tubes 140 pass through the set of refrigerant-tube through holes 4 in the thickness direction TD of the support device 1. The set of refrigerant-tube through holes 4 is placed in the base portion 2 at a place closer to the front of the vehicle than the set of heater-tube through holes 3 is. The set of refrigerant-tube through holes 4 is formed using a set of through-hole forming portions 24 of the second bracket 20 and a set of second through-hole forming portions 34 of the common bracket 30. Each of the set of refrigerant-tube through holes 4 has a diameter sized to compress the insulator of the corresponding refrigerant tube 140. The set of refrigerant-tube through holes 4 are support holes for supporting the set of refrigerant tubes 140 by compressing the respective insulators. The set of refrigerant-tube through holes 4 have different diameters for the set of refrigerant tubes 140 having different outer diameters. The set of refrigerant-tube through holes 4 is disposed in an alignment direction that is orthogonal to the alignment direction of the set of heater-tube through holes 3. That is, the second bracket 20 and the common bracket 30 hold therebetween the set of refrigerant tubes 140 placed in the direction orthogonal to the direction in which the set of heater tubes 130 is placed. The set of refrigerant-tube through holes 4 is disposed, for example, in an alignment direction that is parallel to a longitudinal direction LD of the support device 1.

The set of refrigerant-tube through holes 4 is formed in a range, with respect to the alignment direction of the set of heater-tube through holes 3, between the heater-tube through holes 3 with portions included where the set of heater-tube through holes 3 are formed. In other words, the set of refrigerant-tube through holes 4 is located in a range between opposite ends of the set of the heater-tube through holes 3 with respect to the alignment direction of the set of heater-tube through holes 3. The range between the opposite ends of the set of heater-tube through holes 3 refers to a range from an end portion of one of the heater-tube through holes 3 opposite the other one of the heater-tube through holes 3 to an end portion of the other one of the heater-tube through holes 3 opposite the one of the heater-tube through holes 3.

The attachment portion 6 has an attachment hole through which a fastener such as a screw passes. The attachment portion 6 extends externally from an outer edge 2b of the base portion 2. One attachment portion 6 is placed on each of both opposite ends of the base portion 2 in the longitudinal direction LD. The attachment portions 6 are placed near or at the middle in the widthwise direction SD. The attachment portions 6 are placed in a range in the widthwise direction SD where the refrigerant-tube through holes 4 and the heater-tube through holes 3 are located. One each of the attachment portions 6 is placed on, for example, the first bracket 10 and the common bracket 30. The attachment portions 6 are placed in a range, with respect to the alignment direction of the set of heater tubes 130, between the opposite ends of the set of heater-tube through holes 3. At least one each of the attachment portions 6 is placed in this range opposite to each other across the set of heater tubes 130 and the set of refrigerant tubes 140. The attachment portions 6 as described above enable stable installation of the support device 1 to the floor board 70 with the tubes 130 and 140 supported. The attachment portions 6 are for installing and securing the support device 1 to the floor board 70 by tightening fasteners through the attachment holes to the floor board 70. Each of the attachment portions 6 has a surface attached to the floor board 70, and this surface is placed closer to the floor board 70 than the base surface 2a is in the thickness direction TD.

The base portion 2 includes a coupler retainer portion 5. The coupler retainer portion 5 has a tubular shape having a bottom portion. The coupler retainer portion 5 includes a portion of the base portion 2 where the set of refrigerant-tube through holes 4 are formed as the bottom portion, and a wall portion having a tubular shape, raised from the base surface 2a and surrounding the set of refrigerant-tube through holes 4. The coupler retainer portion 5 is formed by combining the second bracket 20 and the common bracket 30. The coupler retainer portion 5 has an inner circumferential surface having ribs placed at predefined intervals in a circumferential direction. The ribs extend from the inner circumferential surface of the wall portion of the coupler retainer portion 5 toward the bottom portion and, at the bottom portion, toward the center of the bottom portion. The coupler retainer portion 5 retains the coupling member 60, which couples the refrigerant-tube through holes 4 to the external tubes, using the ribs.

Tube receiver portions 7 for receiving the tubes are placed on the back surface of the base portion 2. The tube receiver portions 7 are recess portions each having a substantially arc shape, recessed toward the base surface 2a in the thickness direction TD. The tube receiver portions 7 are provided to receive portions of the tubes 130 and 140 that bend and extend to intersect with the thickness direction at right angles near the back surface of the base portion 2 and to thereby position the tubes 130 and 140 with respect to the support device 1.

With reference to FIGS. 5 to 9, the three brackets that configure the support device 1; namely, the first bracket 10, the second bracket 20, and the common bracket 30, are described. The brackets 10, 20, and 30 are formed by using, for example, the same resin material. As illustrated in FIG. 2, different combinations of the brackets 10, 20, and 30 respectively support the set of heater tubes 130 and the set of refrigerant tubes 140, each of which is a set of tubes close to each other. The first bracket 10 has a shape separated in straight line from the common bracket 30 at a boundary that is a straight line passing through the centers of the heater-tube through holes 3. The first bracket 10 includes a mating surface 11 that is mated with a corresponding surface of the common bracket 30, and the set of through-hole forming portions 13 formed in the mating surface 11. The first bracket 10 is one of two brackets that hold the set of heater tubes 130.

Figure 6:
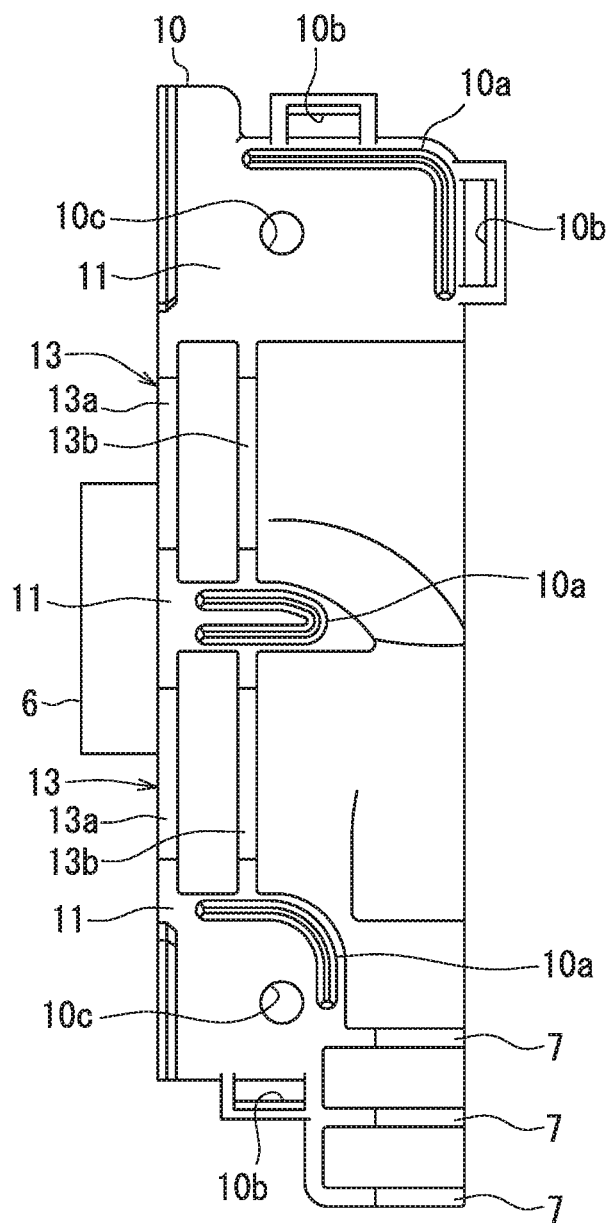
FIG. 6 is a view showing a first bracket viewed from a mating surface.
Figure 6:
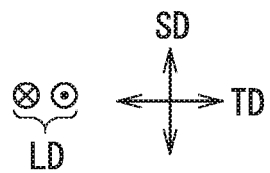

The mating surface 11 is a surface extending parallel to, for example, the alignment direction of the set of heater-tube through holes 3. As illustrated in FIG. 6, an insertion hole portion 10c, a ridge portion 10a, and an engagement receiver portion 10b are formed in the mating surface 11. The ridge portion 10a fits into a corresponding groove portion 30a of the common bracket 30 when the first bracket 10 is coupled to the common bracket 30. One insertion hole portion 10c is formed in each of both lateral locations in the alignment direction of the set of through-hole forming portions 13. When the first bracket 10 and the common bracket 30 are coupled together, a fastener is passed through each insertion hole portion 10c and a corresponding insertion hole portion 30c in the common bracket 30 to secure the first bracket 10 and the common bracket 30 to each other. The engagement receiver portion 10b is a portion having an opening in which an engagement lug portion 30b of the common bracket 30 engages. A plurality of engagement receiver portions 10b is provided.

Each of the set of through-hole forming portions 13 includes, for example, a front rib 13a and a back rib 13b. The front rib 13a is located closer to the base surface 2a of the base portion 2 than the back rib 13b is in the thickness direction TD. The front rib 13a is recessed in a semicircular arc shape from the mating surface 11. The back rib 13b is located closer to the back surface of the base portion 2 than the front rib 13a is in the thickness direction TD. The back rib 13b is recessed in a semicircular arc shape from the mating surface 11 as with the front rib 13a, the semicircular arc shape having a diameter sized to compress the corresponding insulator. The set of through-hole forming portions 13 supports the heater tubes 130 with, for example, the back ribs 13b in direct contact with the respective heater tubes 130. The back ribs 13b are in intimate contact with the insulators to thereby inhibit air, moisture, dust, and other substances from entering the inside of the vehicle through gaps between the heater tubes 130 and the first bracket 10. The front rib 13a is a recess portion where the metal portion of the heater tube 130, not covered with the insulator, is located. Alternatively, the front rib 13a may be in contact with the corresponding insulator to support the corresponding heater tube 130. The set of through-hole forming portions 13 support the each of the set of heater tubes 130 from the same direction that is orthogonal to the alignment direction of the set of heater tubes 130. The set of through-hole forming portions 13 combines with the set of first through-hole forming portions 33 of the common bracket 30 to form the set of heater-tube through holes 3. The set of through-hole forming portions 13 corresponds to a first bracket support.

The second bracket 20 has a shape separated from the common bracket 30 at a substantially L-shaped separation line. The second bracket 20 includes a mating surface 22 that is mated with a corresponding surface of the common bracket 30, and the set of through-hole forming portions 24 formed in the mating surface 22. The set of through-hole forming portions 24 for forming the set of refrigerant-tube through holes 4 is formed in the second bracket 20. The second bracket 20 is one of two brackets that hold the set of refrigerant tubes 140.

The mating surface 22 of the second bracket 20 includes a first surface 22a extending in the alignment direction of the refrigerant tubes 140, and a second surface 22b connected to the first surface 22a. The first surface 22a extends over both lateral locations with respect to the set of through-hole forming portions 24. The second surface 22b is smoothly connected to the first surface 22a. The first surface 22a has ends between which the set of through-hole forming portions 24 is interposed. The second surface 22b is connected to one of the ends of the first surface 22a closer to the set of heater-tube through holes 3. The second surface 22b extends in a direction intersecting with the first surface 22a. The second surface 22b extends in a direction tilted toward the heater tubes 130 from a direction orthogonal to the first surface 22a. The second surface 22b is connected to the outer edge 2b. The second surface 22b includes a first-surface connection portion 22b1 connected to the first surface 22a, and an outer-edge connection portion 22b2 connected to the first-surface connection portion 22b1. The outer-edge connection portion 22b2 is a surface connected to the outer edge 2b of the base portion 2. The gradient with which the outer-edge connection portion 22b2 is tilted with respect to the direction orthogonal to the first surface 22a is smaller than that of the first-surface connection portion 22b1. That is, the mating surface 22 is bent stepwise in a portion closer to the heater-tube through holes 3 than the through-hole forming portions 24 are.

Figure 7:
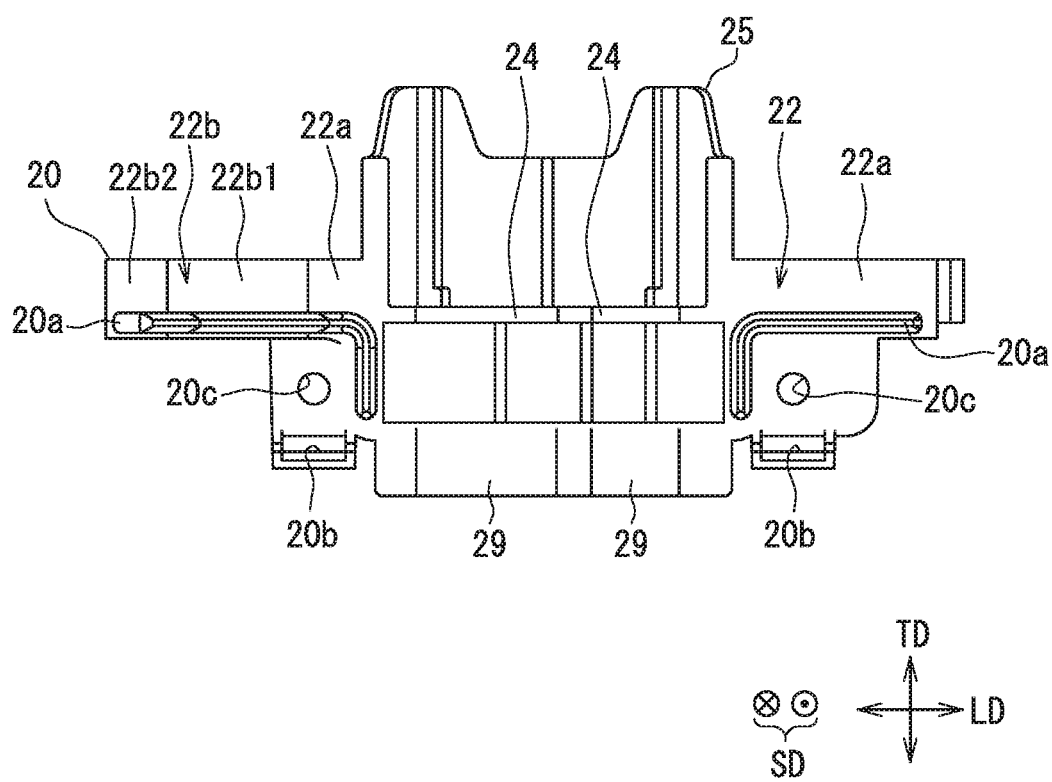
FIG. 7 is a view showing a second bracket viewed from a mating surface.

As illustrated in FIG. 7, a groove portion 20a, an engagement receiver portion 20b, and an insertion hole portion 20c are formed in the mating surface 22. The groove portion 20a extends over the first surface 22a and the second surface 22b. The groove portion 20a is a portion that engages with a corresponding ridge portion 36a of the common bracket 30. The groove portion 20a is bent stepwise to extend along the first surface 22a, the first-surface connection portion 22b1, and the outer-edge connection portion 22b2 of the mating surface 22. The engagement receiver portion 20b is a portion having an opening in which a corresponding engagement lug portion 36b of the common bracket 30 engages. When the second bracket 20 and the common bracket 30 are coupled together, a fastener is passed through each insertion hole portion 20c and a corresponding insertion hole portion 36c in the common bracket 30 to secure the second bracket 20 and the common bracket 30 to each other.

The set of through-hole forming portions 24 are recess portions each having an arc shape, recessed from the first surface 22a. Each of the through-hole forming portions 24 has an arc shape having a diameter sized to compress the insulator of the corresponding refrigerant tube 140. Each of the through-hole forming portions 24 of the second bracket 20 is formed to cover a range equal to or greater than a half of the outer circumference of the corresponding refrigerant tube 140. The set of through-hole forming portions 24 support the each of the set of refrigerant tubes 140 when brought into direct contact with the insulators of the set of refrigerant tubes 140. The set of through-hole forming portions 24 support the set of refrigerant tubes 140 from the same direction that is orthogonal to the alignment direction of the set of refrigerant tubes 140. The set of through-hole forming portions 24 corresponds to a second bracket support.

The second bracket 20 includes an extension portion 25 that forms substantially half of the coupler retainer portion 5. The extension portion 25 is raised from the base surface 2a of the second bracket 20, extending in a semicylindrical shape. A contact portion 29 that is away from the set of through-hole forming portions 24 and brought in contact with the refrigerant tubes 140 is formed in the second bracket 20 in a portion closer to the back surface than the set of through-hole forming portions 24 is in the thickness direction TD. The contact portion 29 has a set of recessed surfaces each having a semicylindrical shape and extending parallel to the thickness direction TD. The set of recessed surfaces serves as contact surfaces that come in contact with the set of refrigerant tubes 140.

The common bracket 30 is substantially L-shaped as a whole. The common bracket 30 includes a first mating surface 31 that is mated with the mating surface 11 of the first bracket 10, and a second mating surface 32 that is mated with the mating surface 22 of the second bracket 20. The common bracket 30 includes the set of first through-hole forming portions 33 and the set of second through-hole forming portions 34. The common bracket 30 is coupled to the first bracket 10 and also to the second bracket 20. The common bracket 30 holds the set of heater tubes 130 using the first bracket 10, and holds the set of refrigerant tubes 140 using the second bracket 20.

Figure 8:
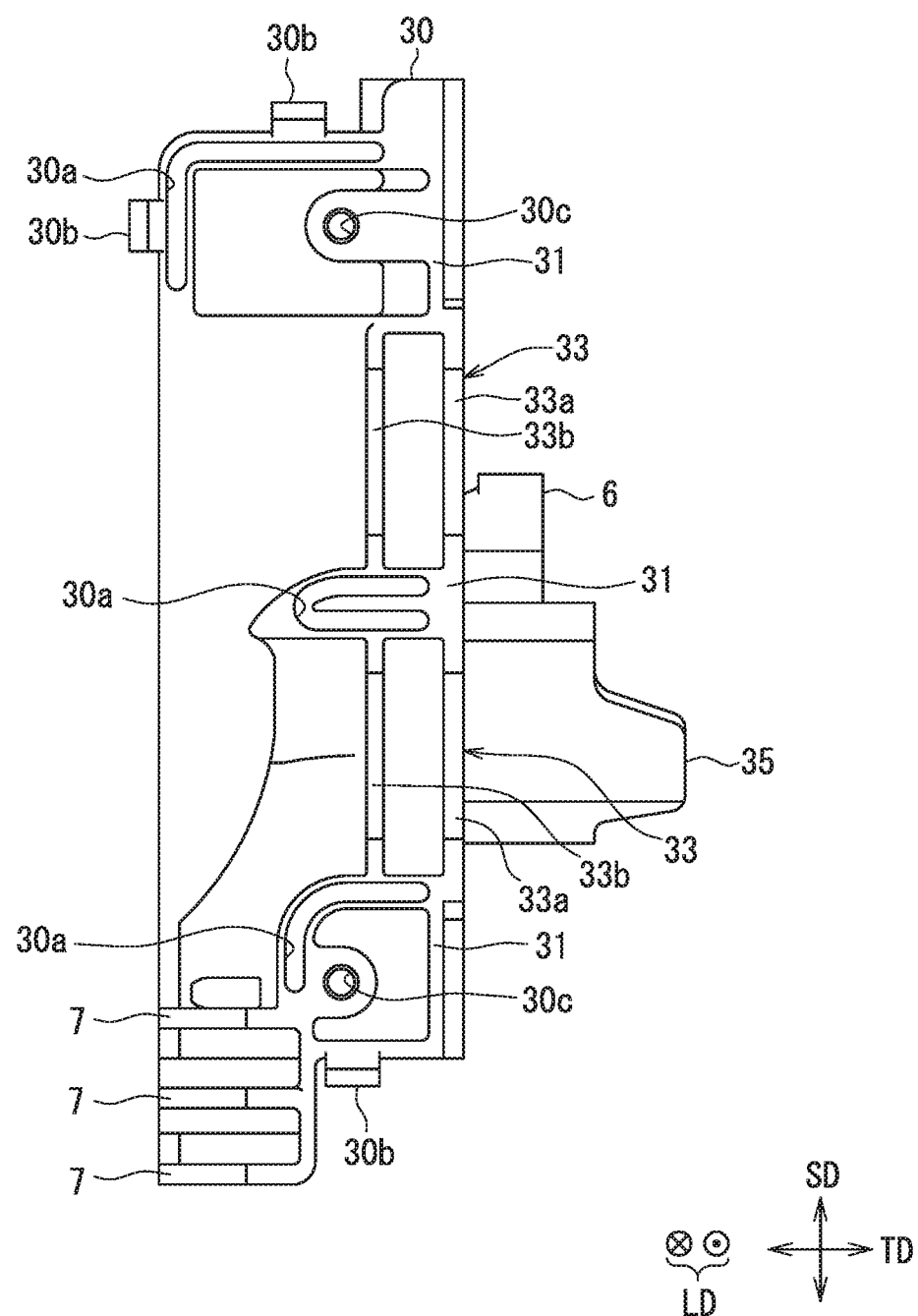
FIG. 8 is a view showing a common bracket viewed from a first mating surface.

As illustrated in FIG. 8, the groove portion 30a, the insertion hole portion 30c, and the engagement lug portion 30b are formed in the first mating surface 31. The groove portion 30a has a groove into which the ridge portion 10a of the first bracket 10 fits. The fastener passing through the first bracket 10 is passed through the insertion hole portion 30c. One insertion hole portion 30c is formed in each of both lateral locations with respect to the set of first through-hole forming portions 33, at positions corresponding to the insertion hole portions 10c of the first bracket 10.

The first through-hole forming portions 33 are recess portions each having a semicircular arc shape, recessed from the first mating surface 31. Each of the first through-hole forming portions 33 includes a front rib 33a and a back rib 33b each having an arc shape having a diameter smaller than the outer diameter of the corresponding heater tube 130, as with the through-hole forming portions 13 of the first bracket 10. The set of first through-hole forming portions 33 combines with the set of through-hole forming portions 13 of the first bracket 10 to form the set of heater-tube through holes 3. The set of first through-hole forming portions 33 supports the heater tubes 130 with, for example, the back ribs 33b in direct contact with the respective heater tubes 130. The set of first through-hole forming portions 33 and the set of through-hole forming portions 13 hold the set of heater tubes 130 therebetween, supporting the set of heater tubes 130 from opposite directions. The set of first through-hole forming portions 33 corresponds to a first tube support. When the set of first through-hole forming portions 33 supports the set of heater tubes 130, the set of first through-hole forming portions 33 is in a location close to the set of second through-hole forming portions 34.

The second mating surface 32 has a shape that corresponds to that of the mating surface 22 of the second bracket 20. That is, the second mating surface 32 includes a first surface 32a and a second surface 32b, as with the mating surface 22 of the second bracket 20. The first surface 32a extends in the alignment direction of the set of second through-hole forming portions 34 over both lateral locations with respect to the set of second through-hole forming portions 34. The second surface 32b extends in a direction tilted toward the heater tubes from a direction orthogonal to the first surface 32a. The second surface 32b includes a first-surface connection portion 32b1 and an outer-edge connection portion 32b2. The first surface 32a of the second mating surface 32 is mated with the first surface 22a of the mating surface 22 of the second bracket 20. The second surface 32b of the second mating surface 32 is mated with the second surface 22b of the mating surface 22 of the second bracket 20.

Figure 9:
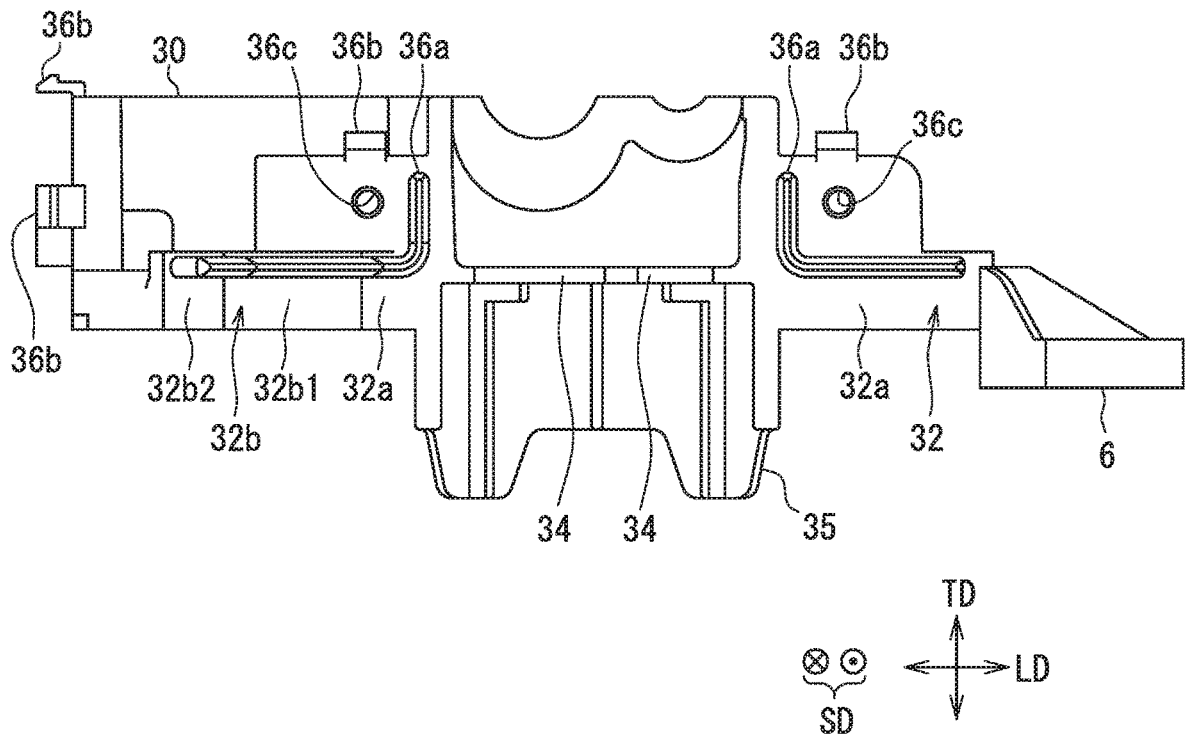
FIG. 9 is a view showing the common bracket viewed from a second mating surface.
Figure 10:
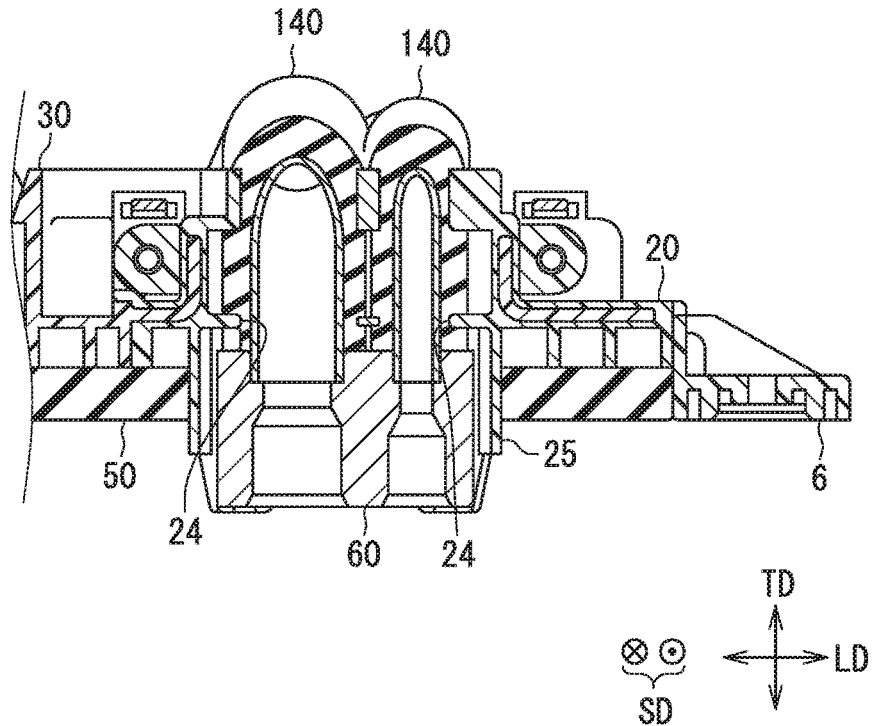
FIG. 10 is a sectional view showing the support device holding heater tubes.
Figure 11:
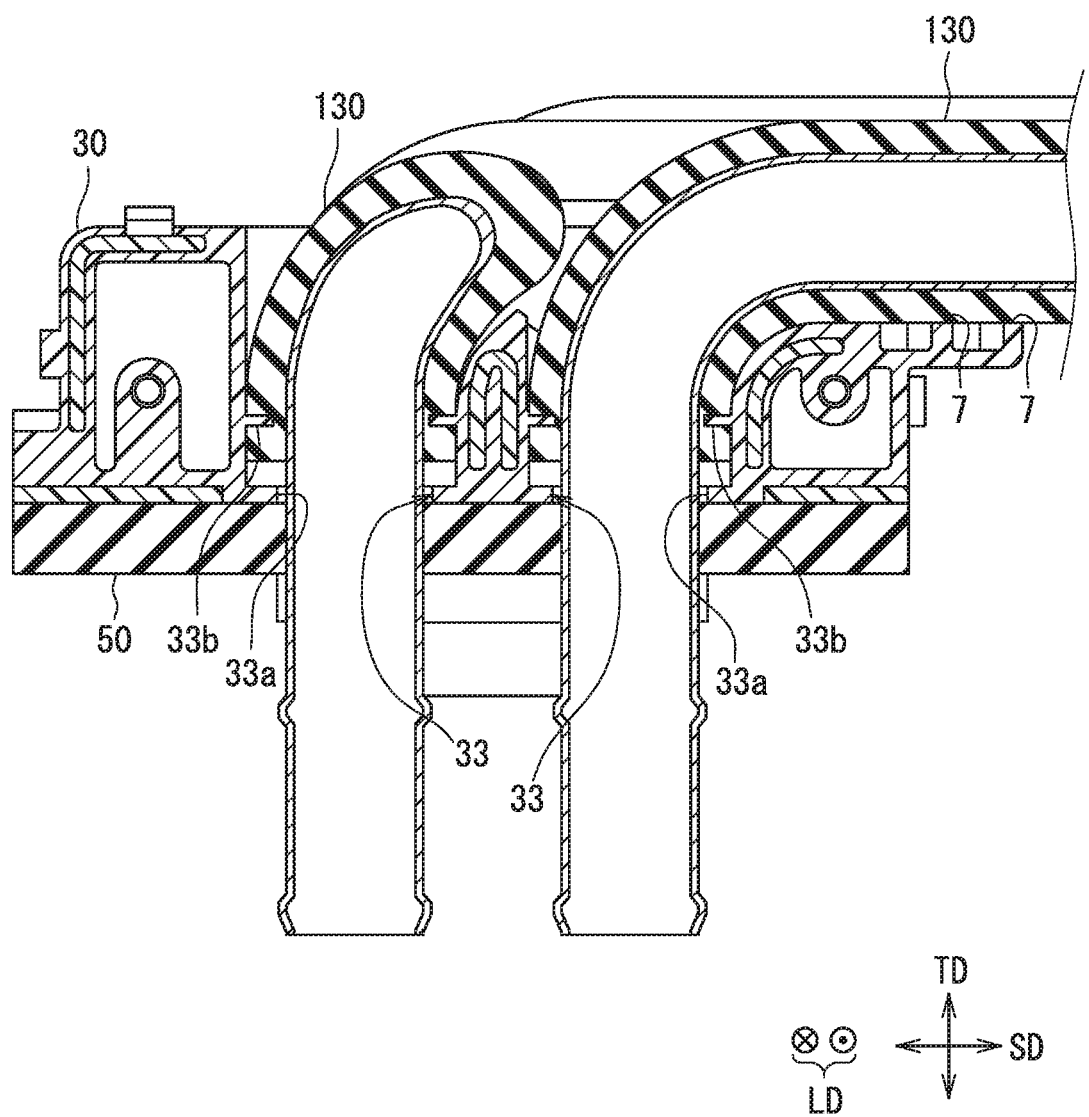
FIG. 11 is a sectional view showing the support device holding refrigerant tubes.

As illustrated in FIG. 9, the ridge portion 36a, the insertion hole portion 36c, and the engagement lug portion 36b are formed in the second mating surface 32. The ridge portion 36a fits into the groove portion 20a in the mating surface 22 of the second bracket 20. The fastener passing through the insertion hole portion 20c of the second bracket 20 is passed through the insertion hole portion 36c. The engagement lug portion 36b includes a protrusion that is hooked on the engagement receiver portion 20b of the second bracket 20, configuring a snap-fit mechanism.

The second through-hole forming portions 34 are recess portions each having an arc shape, recessed from the first surface 32a of the second mating surface 32. Each of the set of second through-hole forming portions 34 has an arc shape having a diameter smaller than the outer diameter of the corresponding refrigerant tube 140, as with the set of through-hole forming portions 24 of the second bracket 20. The set of second through-hole forming portions 34 combines with the set of through-hole forming portions 24 of the second bracket 20 to form the set of refrigerant-tube through holes 4. The set of second through-hole forming portions 34 support each of the set of refrigerant tubes 140 when, for example, brought into direct contact with the insulators of the each of the set of refrigerant tubes 140. The set of second through-hole forming portions 34 and the set of through-hole forming portions 24 hold the set of refrigerant tubes 140 therebetween, supporting the set of refrigerant tubes 140 from opposite directions. The set of second through-hole forming portions 34 corresponds to a second tube support. The set of second through-hole forming portions 34 supports the set of refrigerant tubes 140 in one of two opposite locations across the set of heater tubes 130. That is, both of the set of second through-hole forming portions 34 are formed in one of two opposite locations across an imaginary line connecting the centers of the heater-tube through holes 3. The set of second through-hole forming portions 34 is placed in the range, with respect to the alignment direction of the set of heater tubes 130, between the first through-hole forming portions 33 with the portions included where the set of first through-hole forming portions 33 are formed.

The common bracket 30 includes an extension portion 35 that forms the coupler retainer portion 5. The extension portion 35 extends from a surface of the common bracket 30 in a semicylindrical shape. The extension portion 35, together with the extension portion 25 of the second bracket 20, forms the coupler retainer portion 5 having a tubular shape.

An example method for assembling the support device 1 is described next. When, for example, the heater tubes 130 are assembled before the refrigerant tubes 140, the heater tubes 130 are held between the first bracket 10 and the common bracket 30 first. Specifically, the first bracket 10 and the common bracket 30 are coupled together with the heater tubes 130 held between the through-hole forming portions 13 of the first bracket 10 and the first through-hole forming portions 33 of the common bracket 30, the set of heater tubes 130 oriented in a direction orthogonal to the alignment direction of the heater tubes 130. The mating surface 11 of the first bracket 10 and the first mating surface 31 of the common bracket 30 are mated together with the ridge portion 10a fitted in the groove portion 30a and the engagement lug portion 30b engaged in the engagement receiver portion 10b. The insulators of the heater tubes 130 are held and compressed by the back ribs 13b of the through-hole forming portions 13 and the back ribs 33b of the first through-hole forming portions 33. The first bracket 10 and the common bracket 30 are thus assembled with the set of heater tubes 130 held therebetween. Fasteners are then passed through the insertion hole portions 10c and 30c to tighten the first bracket 10 and the common bracket 30 together, reliably coupling the first bracket 10 and the common bracket 30 to each other.

Subsequently, the second bracket 20 and the common bracket 30 are assembled to the set of refrigerant tubes 140. The second bracket 20 and the common bracket 30 are coupled together with the set of refrigerant tubes 140 held between the set of through-hole forming portions 24 of the second bracket 20 and the set of second through-hole forming portions 34 of the common bracket 30, the set of refrigerant tubes 140 oriented in a direction orthogonal to the alignment direction of the refrigerant tubes 140. The mating surface 22 of the second bracket 20 and the second mating surface 32 of the common bracket 30 are mated together with the ridge portion 36a fitted in the groove portion 20a and the engagement lug portion 36b engaged in the engagement receiver portion 20b. The refrigerant tubes 140 are secured to the support device 1 with the insulators of the refrigerant tubes 140 held and compressed between the through-hole forming portions 24 and 34. Fasteners are then passed through the insertion hole portions 20c and 36c to tighten the second bracket 20 and the common bracket 30 together, reliably coupling the second bracket 20 and the common bracket 30 to each other.

The sealing material is affixed to the base surface 2a with the support device 1 assembled to the tubes 130 and 140. Then, the sealing material affixed to the support device 1 is brought into intimate contact with the floor board 70 to cover the vehicle body through-hole portion in the floor board 70. Fasteners are passed through the attachment portions 6 and tightened to the floor board 70 to thereby secure the support device 1 to the floor board 70.

As described above, the set of heater tubes 130 and the set of refrigerant tubes 140 can be secured to the floor board 70 using the support device 1. The set of heater tubes 130 and the set of refrigerant tubes 140 are exposed to the outside of the vehicle from the surface of the support device 1. Each of the set of heater tubes 130 is connected to a corresponding external tube. Each of the set of refrigerant tubes 140 is connected to a corresponding external tube via the coupling member 60 retained by the coupler retainer portion 5.

Operational advantages produced by the support device 1 according to the first embodiment are described next. The support device 1 is a device for securing the set of heater tubes 130 and the set of refrigerant tubes 140 to the vehicle body. The set of heater tubes 130 and the set of refrigerant tubes 140 extend from inside of the air conditioning case 101 of the vehicle air conditioning system 100 to the outside of the air conditioning case 101. The support device 1 is separate from the air conditioning case 101. The support device 1 includes the first bracket 10 and the second bracket 20. The first bracket 10 includes the set of through-hole forming portions 13 for supporting the set of heater tubes 130. The second bracket 20 includes the set of through-hole forming portions 24 for supporting the set of refrigerant tubes 140. The support device 1 includes the common bracket 30 that is connected to both of the first bracket 10 and the second bracket 20. The common bracket 30 includes the set of first through-hole forming portions 33. The set of first through-hole forming portions 33 and the set of through-hole forming portions 13 of the first bracket 10 hold the set of heater tubes 130 therebetween, supporting the set of heater tubes 130 from opposite directions. The common bracket 30 includes the set of second through-hole forming portions 34. The set of second through-hole forming portions 34 and the set of through-hole forming portions 24 hold the set of refrigerant tubes 140 therebetween, supporting the set of refrigerant tubes 140 from opposite directions.

The first bracket 10, the second bracket 20, and the common bracket 30 are separate from the air conditioning case 101. Thus, the assembly sequence of the brackets is not affected by the assembly sequence of the air conditioning case 101. Furthermore, in the support device 1, the first bracket 10 and the common bracket 30 hold therebetween the set of heater tubes 130, and the second bracket 20, which is different from the first bracket 10, and the common bracket 30 hold therebetween the set of refrigerant tubes 140. Either of the set of heater tubes 130 and the set of refrigerant tubes 140 can be thus held first when the support device 1 is assembled to the tubes. Thus, the sequence of assembly of the support device 1 to the tubes can be readily changed. Furthermore, the common bracket 30 supports both of the set of heater tubes 130 and the set of refrigerant tubes 140 using the first bracket 10 and the second bracket 20, respectively. The tubes can be thus supported using three brackets, and hence increase in the number of constituent elements for supporting the tubes can be inhibited. Therefore, the support device 1 can be provided that offers a high degree of freedom in assembly sequence while inhibiting increase in the number of constituent elements. Since the support device 1 offers a high degree of freedom in assembly sequence, the support device 1 allows arbitrary selection of assembly sequence in accordance with factors such as the configuration of at assembly line, thereby improving flexibility in assembly.

The set of first through-hole forming portions 33 is closer to the set of second through-hole forming portions 34 than the set of heater tubes 130 is. Thus, when the common bracket 30 is in contact with the set of heater tubes 130, the common bracket 30 is in a location close to the set of refrigerant tubes 140. This means that, when the first bracket 10 is coupled to the common bracket 30 to hold the set of heater tubes 130, the first bracket 10 is in a location away from the set of refrigerant tubes 140. The first bracket 10 can thus be inhibited from interfering with the set of refrigerant tubes 140 during the assembly of the first bracket 10. Therefore, ease of assembly of the support device 1 can be further enhanced.

The set of second through-hole forming portions 34 is placed in the range between opposite ends of the set of first through-hole forming portions 33 with respect to the alignment direction of the set of heater tubes 130. The dimensions of the support device 1 can be thus reduced in comparison to a support device 1 that supports the set of refrigerant tubes 140 outside of this range described above with respect to the alignment direction of the set of heater tubes 130.

The second bracket 20 and the common bracket 30 hold therebetween the set of refrigerant tubes 140, which is placed in a direction orthogonal to the alignment direction of the set of heater tubes 130. Thus, the dimensions of the support device 1 in the alignment direction of the set of heater tubes 130 can be inhibited from increasing.

The mating surface 22 of the second bracket 20 is mated with the mating surface 32 of the common bracket 30 when the second bracket 20 and the common bracket 30 are coupled together. The mating surfaces 22 and 32 have the respective first surfaces 22a and 32a that extend over both lateral locations with respect to the set of refrigerant tubes 140 in the alignment direction of the set of refrigerant tubes 140. The mating surface 22 includes the second surface 22b, which is connected to an end portion of the first surface 22a toward the set of heater tubes 130 and extends in a direction tilted toward the set of heater tubes 130 from a direction orthogonal to the first surface 22a. The mating surface 32 includes the second surface 32b, which is connected to an end portion of the first surface 32a toward the set of heater tubes 130 and extends in a direction tilted toward the set of heater tubes 130 from a direction orthogonal to the first surface 22a.

Since the second surfaces 22b and 32b are tilted toward the set of heater tubes 130, the second bracket 20 and the common bracket 30 are not likely to interfere with each other when the brackets 20 and 30 are assembled to the set of refrigerant tubes 140. Specifically, when the set of refrigerant tubes 140 is held between the second bracket 20 and the common bracket 30 in a direction orthogonal to the alignment direction of the set of refrigerant tubes 140, a portion of the second bracket 20 where the second surface 22b is formed and a portion of the common bracket 30 where the second surface 32b is formed can be inhibited from interfering with each other. Thus, the second bracket 20 and the common bracket 30 can be more readily assembled together.

The second surface 22b includes the first-surface connection portion 22b1 connected to the first surface 22a, and the outer-edge connection portion 22b2 connected to the outer edge 2b. The second surface 32b includes the first-surface connection portion 32b1 connected to the first surface 32a, and the outer-edge connection portion 32b2 connected to the outer edge 2b. The outer-edge connection portion 22b2 is tilted with a smaller gradient than the first-surface connection portion 22b1 with respect to the direction orthogonal to the first surface 32a. The outer-edge connection portion 32b2 is tilted with a smaller gradient than the first-surface connection portion 32b1 with respect to the direction orthogonal to the first surface 22a, 32a.

Since the outer-edge connection portions 22b2 and 32b2 are tilted with a smaller gradient than the respective first-surface connection portions 22b1 and 32b1 with respect to the direction orthogonal to the respective first surfaces 22a and 32a, a portion of the common bracket 30 corresponding to the outer edge 2b can be increased in length. Thus, the strength of the portion of the common bracket 30 corresponding to the outer edge 2b can be increased.

The second bracket 20 includes the set of through-hole forming portions 24, which is a set of recess portions that comes in contact with the set of refrigerant tubes 140. Each of the through-hole forming portions 24 is formed to come in contact with the corresponding set of refrigerant tube 140 in the range equal to or greater than a half of the outer circumference of the corresponding set of refrigerant tube 140 when the set of refrigerant tubes 140 is supported. The second bracket 20 can thus be singly attached to the set of refrigerant tubes 140. Therefore, the second bracket 20 can be attached to the set of refrigerant tubes 140 before the second bracket 20 and the common bracket 30 are coupled together, and thus the support device 1 can be more readily assembled to the tubes.

A modification of the support device 1 according to the first embodiment is described as a second embodiment. Constituent elements in FIG. 12 and those in the drawings of the first embodiment that are designated with the same symbols are similar constituent elements and produce similar operational advantages. In FIGS. 12 to 15 which correspond to the second embodiment and beyond, illustration of the ribs having a grid shape formed in the base surface 2a is omitted.

Figure 12:
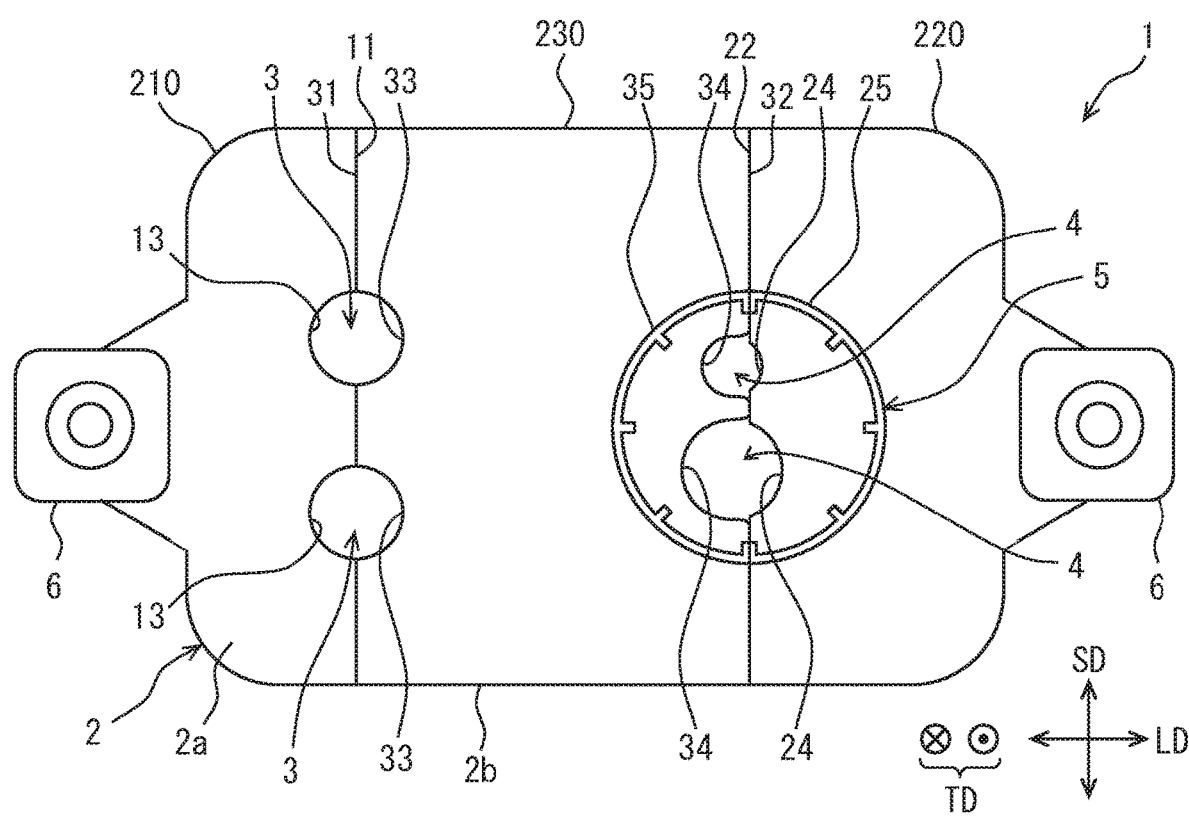
FIG. 12 is a view showing a support device according to at least one embodiment.
Figure 13:
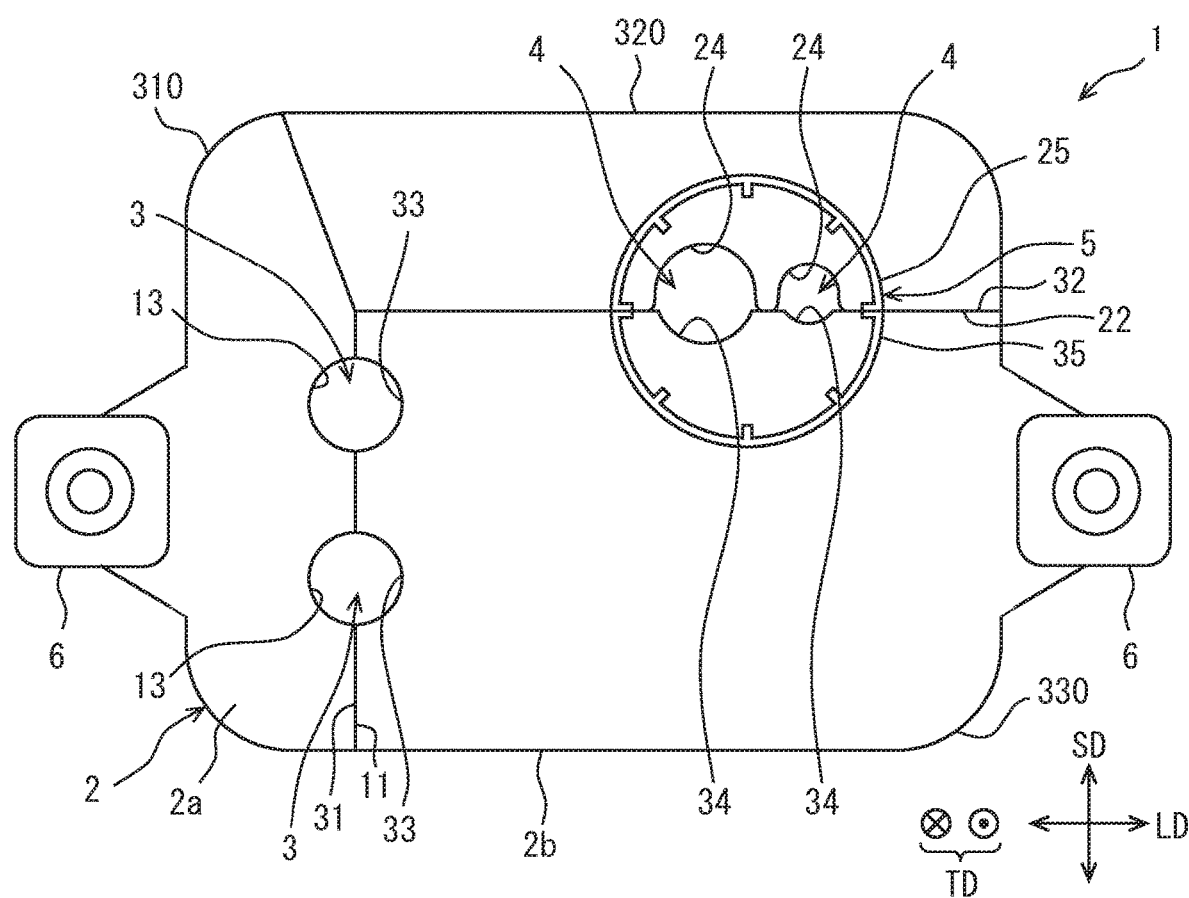
FIG. 13 is a view showing a support device according to at least one embodiment.
Figure 14:
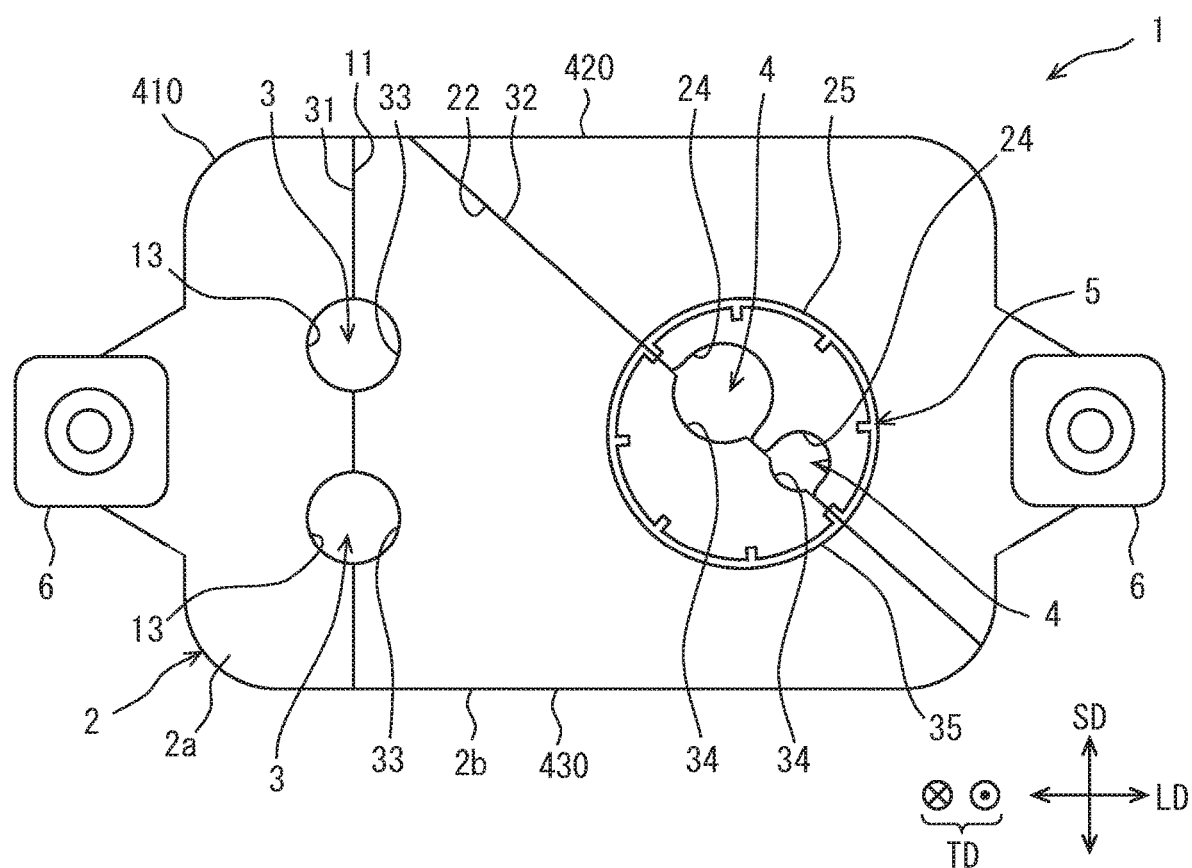
FIG. 14 is a view showing a support device according to at least one embodiment.

As illustrated in FIG. 12, a support device 1 according to the second embodiment includes a set of refrigerant-tube through holes 4 that is placed parallel to an alignment direction of a set of heater-tube through holes 3. A common bracket 230 has a shape sandwiched between a first bracket 210 and a second bracket 220. That is, the support device 1 is configured so that a set of heater tubes 130 and a set of refrigerant tubes 140 are held in the same direction, which is a direction orthogonal to the alignment direction of the tubes.

The common bracket 230 has a set of first through-hole forming portions 33 and a set of second through-hole forming portions 34 that are formed parallel to each other. The common bracket 230 has a first mating surface 31 and a second mating surface 32 that extend substantially parallel to each other. That is, the common bracket 230 can be described as a middle one of three brackets formed by dividing the support device 1 at a straight line passing through the set of heater-tube through holes 3 and at a straight line passing through the set of refrigerant-tube through holes 4.

The second bracket 220 has a mating surface 22 that extends substantially parallel to a mating surface 11 of the first bracket 210, as with the second mating surface 22. The mating surface 22 is connected to an outer edge 2b of the second bracket 220.

By using the configuration described above, the common bracket 230 can also support both of the set of heater tubes 130 and the set of refrigerant tubes 140 using the first bracket 210 and the second bracket 220, respectively. In the support device 1 according to the second embodiment, in particular, the set of refrigerant-tube through holes 4 is placed parallel to the alignment direction of the set of heater-tube through holes 3. Thus, the need to significantly bend the mating surface 22 of the second bracket 220 and the second mating surface 32 of the common bracket 230, i.e., the need to provide first surfaces 22a and 32a and second surfaces 22b and 32b, is eliminated, in comparison to the support device 1 of the first embodiment. The second bracket 220 and the common bracket 230 are therefore unlikely to interfere with each other when they are assembled, and thus the ease of assembly can be improved.

A modification of the support device 1 according to the first embodiment is described as a third embodiment. Constituent elements in FIG. 13 and those in the drawings of the first embodiment that are designated with the same symbols are similar constituent elements and produce similar operational advantages.

A support device 1 according to the third embodiment includes a set of refrigerant-tube through holes 4 that is formed, with respect to the alignment direction of a set of heater tubes 130, outside of the range between a set of heater-tube through holes 3, the range including portions where the set of heater-tube through holes 3 are formed. A common bracket 330 generally has, for example, a rectangular shape. The common bracket 330 has a first mating surface 31 and a second mating surface 32 that are two adjacent sides of this rectangular shape. By using the configuration described above, the common bracket 330 can also support both of the set of heater tubes 130 and the set of refrigerant tubes 140 using a first bracket 310 and a second bracket 320, respectively.

A modification of the support device 1 according to the first embodiment is described as a fourth embodiment. Constituent elements in FIG. 14 and those in the drawings of the first embodiment that are designated with the same symbols are similar constituent elements and produce similar operational advantages.

A support device 1 according to the fourth embodiment includes a set of refrigerant-tube through holes 4 that is placed in a direction obliquely intersecting with an alignment direction of a set of heater-tube through holes 3. A second bracket 420 and a common bracket 430 hold therebetween a set of refrigerant tubes 140 in an oblique direction with respect to a direction orthogonal to the alignment direction of the set of heater tubes 130. That is, the support device 1 supports the set of refrigerant tubes 140 and the set of heater tubes 130 where the set of refrigerant tubes 140 is placed in a direction obliquely intersecting with the alignment direction of the set of heater tubes 130. Second through-hole forming portions 34 of the common bracket 430 are closer to a set of first through-hole forming portions 33 than the set of refrigerant tubes 140 is. The second bracket 420 can be thus inhibited from interfering with the set of heater tubes 130 and the common bracket 430 when the second bracket 420 and the common bracket 430 are coupled together, and thus the assembly can be readily performed.

A mating surface 22 and a second mating surface 32 extend substantially straight to be connected to, for example, an outer edge 2b. The mating surface 22 and the second mating surface 32 may have no respective first surfaces 22a and 32a or second surfaces 22b and 32b, which in the first embodiment extend in mutually different directions, as long as the mating surface 22 and the second mating surface 32 do not interfere with the set of heater-tube through holes 3. If, for example, the mating surface 22 and the second mating surface 32 that extend straight from both end portions of the set of refrigerant tubes 140 interfere with the set of heater-tube through holes 3, the mating surface 22 and the second mating surface 32 may be configured as described below. That is, the mating surface 22 and the second mating surface 32 may each include a first surface that extends over both lateral locations with respect to the set of refrigerant tubes 140 in the alignment direction of the set of refrigerant tubes 140, and a second surface that is connected to an end portion of the corresponding first surface toward the set of heater tubes 130 and is tilted toward the set of heater tubes 130 from a direction orthogonal to the first surface.

By using the configuration described above, the common bracket 430 can also support both of the set of heater tubes 130 and the set of refrigerant tubes 140 using a first bracket 410 and the second bracket 420, respectively. Portions of the second bracket 420 and the common bracket 430 that are prone to interfere with each other during assembly are particularly small in the support device 1 according to the fourth embodiment, and thus the ease of assembly can be enhanced.

The disclosure presented herein is not limited to the embodiments provided as examples. The disclosure includes the embodiments provided herein as examples and modifications made by persons skilled in the art based on the embodiments provided herein. For example, the disclosure is not limited to components and/or combinations of elements presented in the embodiments. The disclosure can be implemented in various combinations. The disclosure can include additional portions that can be added to the embodiments. The disclosure includes any of the embodiments with a component and/or element thereof omitted. The disclosure includes replacement or combination of a component and/or element of one of the embodiments with that of another one of the embodiments. The technical scope disclosed herein is not limited to the description of the embodiments.

In the embodiments described above, the set of heater tubes 130 and the set of refrigerant tubes each have a circular cross-section. Alternatively, at least one of the tubes may have a non-circular cross-section, which may be in, for example, an oval shape or a flat shape. In such cases, each through hole in the support device has a shape that accommodates the cross-section of its corresponding tube so as to be able to hold the tube.

Figure 15:
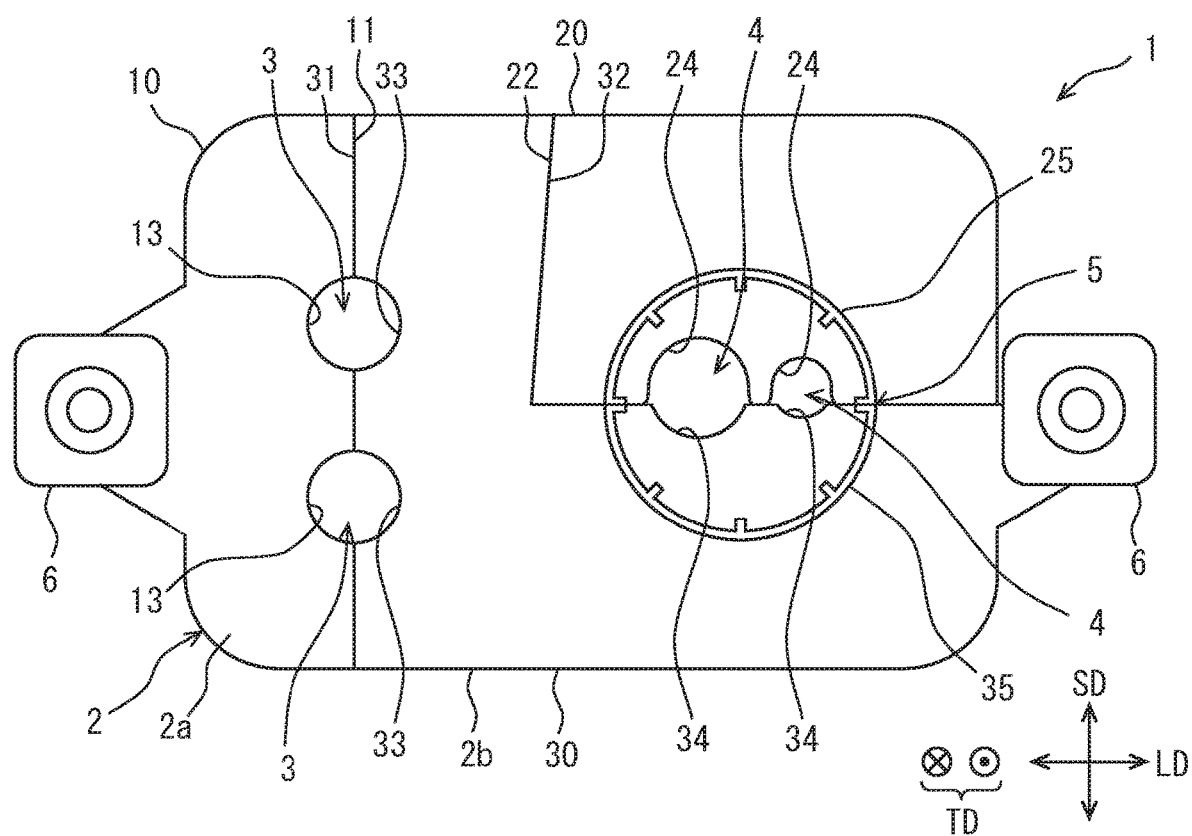
FIG. 15 is a view showing a support device according to at least one embodiment.

In some of the embodiments described above, the second surfaces 22b and 32b each extend in a direction tilted toward the heater-tube through holes 3 from a direction orthogonal to the first surfaces 22a and 32a. Alternatively, as illustrated in FIG. 15, for example, a mating surface 22 and a second mating surface 32 may each include a surface that extends in a direction tilted away from heater-tube through holes 3. Second surfaces 22b and 32b may be tilted with respect to first surfaces 22a and 32a, respectively, with gradients that do not hinder the second bracket 20 and the common bracket 30 from being assembled together.

While the support device 1 is attached to the floor board 70 of a vehicle body in the embodiments described above, the external member to which the support device 1 is attached is not limited to the floor board 70. For example, the support device 1 may be attached to a lateral wall of the vehicle body.

While the support device 1 is for supporting tubes extending from the air conditioning case 101 placed toward the rear of a vehicle in the embodiments described above, the support device 1 may support tubes extending from the air conditioning case 101 placed toward the front of the vehicle. For example, the support device 1 may support tubes extending from the air conditioning case 101 placed in a space between an instrument panel and a dash panel located forward of a vehicle compartment. In such cases, the support device 1 may be attached to the dash panel to cover a through-hole portion formed in the dash panel, supporting tubes extending through the through-hole portion toward the engine compartment.

While the support device 1 is configured to hold the set of refrigerant tubes 140 in one of two opposite locations across the set of heater tubes 130 in the embodiments described above, the positional relationship of the set of heater tubes 130 and the set of refrigerant tubes 140 may be reversed.

In the embodiments described above, the set of first tubes corresponds to two heater tubes 130, and the set of second tubes corresponds to two refrigerant tubes 140. Alternatively, the set of first tubes may correspond to one heater tube 130, and the set of second tubes may correspond to one refrigerant tube 140. Alternatively, the set of first tubes and the set of second tubes may each correspond to three or more tubes.

In the embodiments described above, each of the brackets is brought in direct contact with the insulator of a corresponding tube. Alternatively, an elastic member such as rubber may be placed between each through-hole forming portion of the bracket and a corresponding tube, so that the through-hole forming portion is brought in indirect contact with the tube.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A support device for securing a set of first tubes and a set of second tubes to an external member, the support device being outside an air conditioning case of a vehicle air conditioning system, the support device comprising:
   a first bracket separated from the air conditioning case and including a first bracket support supporting the set of first tubes that extends outward from the air conditioning case;
   a second bracket separated from the air conditioning case and including a second bracket support supporting the set of second tubes that extends outward from the air conditioning case; and
   a common bracket separated from the air conditioning case and coupled to both the first bracket and the second bracket, wherein
   the common bracket includes a first tube support and a second tube support,
   the first tube support supports the set of first tubes and faces the first bracket support across the set of first tubes such that the set of first tubes is held by the first tube support and the first bracket support,
   the second tube support supports the set of second tubes and faces the second bracket support across the set of second tubes such that the set of second tubes is held by the second tube support and the second bracket support,
   the second tube support is placed within a range, in a tube alignment direction of the set of first tubes, between opposite ends of the first tube support,
   the second bracket and the common bracket coupled together each have a mating surface mated with each other, and
   the mating surface includes:
      first surfaces extending in an alignment direction of the set of second tubes on opposite sides of the set of second tubes; and
      a second surface extending continuously from an end of one of the first surfaces between the set of first tubes and the set of second tubes, the second surface extending in a direction that is tilted toward the set of first tubes from a direction orthogonal to the first surface.

2. A support device for securing a set of first tubes and a set of second tubes to an external member, the support device being outside an air conditioning case of a vehicle air conditioning system, the support device comprising:
   a first bracket separated from the air conditioning case and including a first bracket support supporting the set of first tubes that extends outward from the air conditioning case;
   a second bracket separated from the air conditioning case and including a second bracket support supporting the set of second tubes that extends outward from the air conditioning case;
   a common bracket separated from the air conditioning case and coupled to both the first bracket and the second bracket; and
   a plurality of attachment portions to be attached to the external member, wherein
   the common bracket includes a first tube support and a second tube support,
   the first tube support supports the set of first tubes and faces the first bracket support across the set of first tubes such that the set of first tubes is held by the first tube support and the first bracket support,
   the second tube support supports the set of second tubes and faces the second bracket support across the set of second tubes such that the set of second tubes is held by the second tube support and the second bracket support,
   the second tube support is placed within a range, in a tube alignment direction of the set of first tubes, between opposite ends of the first tube support, and
   the plurality of attachment portions is placed within a range, in the alignment direction of the set of first tubes, between opposite ends of a portion supporting the set of first tubes.

3. The support device according to claim 2, wherein the second bracket and the common bracket coupled together each have a mating surface mated with each other,
   the mating surface includes:
      first surfaces extending in an alignment direction of the set of second tubes on opposite sides of the set of second tubes; and
      a second surface extending continuously from an end of one of the first surfaces between the set of first tubes and the set of second tubes, the second surface extending in a direction that is tilted toward the set of first tubes from a direction orthogonal to the first surface.

4. The support device according to claim 1, wherein
   the second surface has a first-surface connection portion continuous from the first surface, and an outer-edge connection portion connected to outer edges of the second bracket and the common bracket coupled together, and
   a tilt angle of the outer-edge connection portion from the direction orthogonal to the first surface is a smaller than a tilt angle of the first-surface connection portion from the direction orthogonal to the first surface.

5. The support device according to claim 1, wherein the first tube support is between the second tube support and the set of first tubes.

6. The support device according to claim 1, wherein the second bracket and the common bracket hold therebetween the set of second tubes aligned in a direction orthogonal to the tube alignment direction of the set of first tubes.

7. The support device according to claim 1, wherein
the second bracket and the common bracket hold therebetween the set of second tubes aligned in a direction obliquely intersecting with the tube alignment direction of the set of first tubes, and
the second tube support is between the first tube support and the set of second tubes.

8. The support device according to claim 1, wherein the second bracket support includes a set of recess portions each of which is in contact with equal to or more than half of an outer circumference of a corresponding one of the set of second tubes such that the set of recess portions holds the set of second tubes.

9. The support device according to claim 1, wherein the second bracket and the common bracket coupled together form a coupler retainer portion retaining a coupling member that is connected to adjacent two of the set of second tubes.

10. An air conditioning system for a vehicle, the system comprising the support device according to claim 1.

* * * * *